United States Patent [19]

Yeakey et al.

[11] Patent Number: 4,785,026

[45] Date of Patent: Nov. 15, 1988

[54] POLYMER POLYOLS WITH HIGH SOLIDS CONTENT

[75] Inventors: Ernest L. Yeakey; Michael Cuscurida, both of Austin, Tex.

[73] Assignee: ARCO Chemical Company, Newtown Square, Pa.

[21] Appl. No.: 124,665

[22] Filed: Nov. 24, 1987

[51] Int. Cl.$^4$ .................................... C08G 18/30
[52] U.S. Cl. ....................... 521/137; 521/138; 521/139; 521/141; 521/164; 521/167; 521/173; 521/180; 528/75; 528/76; 528/85
[58] Field of Search ............... 528/75, 76, 85; 521/137, 138, 139, 141, 164, 167, 173, 180

[56] References Cited

U.S. PATENT DOCUMENTS

| | | | |
|---|---|---|---|
| 2,683,730 | 7/1954 | Seeger | 260/453 |
| 2,929,800 | 3/1960 | Hill, Jr. | 260/77.5 |
| 2,950,263 | 8/1960 | Abbotson | 260/2.5 |
| 3,012,008 | 12/1961 | Lester | 260/75 |
| 3,294,751 | 12/1966 | Beitchman | 260/75 |
| 3,344,162 | 9/1967 | Rowton | 260/453 |
| 3,362,979 | 1/1968 | Bentley | 260/453 |
| 3,666,724 | 5/1972 | Hostettler | 260/75 |
| 4,089,835 | 5/1978 | Komig | 260/31.6 |
| 4,093,569 | 6/1978 | Reischl | 260/2.5 |
| 4,107,102 | 8/1978 | Dahm | 521/16.3 |
| 4,118,376 | 10/1978 | Pedain | 528/59 |
| 4,293,470 | 10/1981 | Cuscurida | 260/45.9 |
| 4,296,213 | 10/1981 | Cuscurida | 521/166 |
| 4,374,209 | 2/1983 | Rowlands | 521/116 |
| 4,435,527 | 3/1984 | Cuscurida | 521/173 |
| 4,452,923 | 6/1984 | Carroll et al. | 521/167 |
| 4,518,778 | 5/1985 | Cuscurida | 521/164 |

FOREIGN PATENT DOCUMENTS 2072204A 9/1981 United Kingdom.

*Primary Examiner*—Morton Foelak
*Assistant Examiner*—Acquah: S. A.
*Attorney, Agent, or Firm*—Steve Rosenblatt; David H. Mossman

[57] ABSTRACT

Polymer polyols with high polymer or solids content made by the reaction of alkanolamines with polyisocyanates in a dispersing media of polymer polyols created from vinyl monomers in a conventional manner. The equivalents of alkanolamine to equivalents of polyisocyanate ranges from about 1/1 to 5/1 to give novel polymer polyols with solid contents from about 25% to up to 50%. Polyurethane foams made employing the novel polymer polyols of the present invention have higher load bearing properties, and provide a good balance between the load bearing properties and the open cell content of the foam to provide a stable foam, as compared with those employing only conventional polymer polyols.

19 Claims, No Drawings

POLYMER POLYOLS WITH HIGH SOLIDS CONTENT

FIELD OF THE INVENTION

The invention relates to the field of polyurethane plastics and more particularly relates to polymer polyols used to make polyurethanes and polyurethanes made therefrom.

BACKGROUND OF THE INVENTION

The use of a polyol in the preparation of polyurethanes by reaction of the polyol with a polyisocyanate in the presence of a catalyst and perhaps other ingredients is well known. Conventional polyols for flexible polyurethane foams are usually made by the reaction of a polyhydric alcohol with an alkylene oxide, usually ethylene oxide and/or propylene oxide, to a molecular weight of about 2,000 to 5,000 and above. These polyols are then reached with polyisocyanate in the presence of water or other blowing agents such as fluorocarbons to obtain polyurethane foams. Polyols have been modified in many ways in attempts to improve the properties of the resulting polyurethane.

For example, elastomeric polytetramethylene ether polyurethane polymers may be made from reactions involving a polytetramethylene ether glycol having a molecular weight of at last 750, an organic diisocyanate and a chain extender containing active hydrogen according to U.S. Pat. No. 2,929,800. The glycol may be added to the diisocyanate to form a prepolymer.

Highly elastic polyurethane foams having a density, sag factor, tensile strength and elongation at break which make them suitable for use in upholstery may be prepared by reacting a poly(alkylene ether) polyol having at least about 10% by weight of primary hydroxyl groups and hydrazine or a hydrazine adduct with an organic polyisocyanate which contains at least about 50% by weight of distilled tolylene diisocyanate, according to U.S. Pat. No. 4,107,102.

U.S. Pat. No. 3,294,751 relates to the preparation of polyurethanes via a modified polyol called a ureidopolyol. These low molecular weight ureido-polyols are formed by the reaction of an organic compound consisting of a hydrocarbon group having less than 10 carbons atoms and at least one isocyanate grop and an alkanolamine. Further, the invention disclosed in U.S. Pat. No. 4,118,376 concerns hydrocurable compositions suitable for use as coatings, adhesives or grouts. The composition contains oxazolidine compounds and free isocyanate groups containing prepolymers where the prepolymers are obtained by the reaction of polyisocyanates with special types of dispersions where the dispersed phase is synthesized in situ in a dispersing media of polyhydroxyl compounds.

Other modified polyols are known in which vinyl monomers such as styrene or acrylonitrile or other materials such as hydrazine hydrate have been included to improve the properties of the polyols and thus, the properties of the resulting foam. However, some of these materials are higly toxic and require, in addition, stripping of unreacted vinyl monomers or water of hydration.

A German process described in Offenlegungsschrift No. 2,110,055 is known for making a polyurethane product whereby a hydroxyl-containing amine is included in the formulation in a one-shot process. That is, the hydroxyl-containing amine is simply included initially with the polyol and the polyisocyanate, and a polyurethane product results. The process does not use a polyurea polymer polyol which is then reacted with a polyisocyanate.

A polymer-modified polyol may be formed by polymerizing an alkanolamine with an organic polyisocyanate in the presence of a polyol as taught by British patent application No. 2,072,204A. The alkanolamine may react polyfunctionally with the polyisocyanate to produce polyaddition products which may constitute a stable dispersion in the polyol. The resulting modified polyol is stated to be particularly useful as a polyol starting material for reaction with a polyisocyanate in the manufacture of polyurethane foam.

Stable dispersions are also revealed in U.S. Pat. No. 4,089,835. Here, the stable dispersions comprise polyureas and/or polyhydrazodicarbonamides as the dispersed phase in a hydroxyl group-containing material selected from the group of polyethers, polyester, polyester amides and polycarbonates. These dispersions may be produced by reacting organic polyisocyanates with polyamides containing primary and/or secondary amino groups and/or hydrazines and/or hydrazines in the hydroxyl-containing material. Another patent relating to stable dispersions is U.S. Pat. No. 4,293,470 which relates to stabilizing polyurea polymer polyols by treating them with a secondary amine.

Similar polymer polyols prepared in the presence of water to reduce viscosity are taught as being useful in high resilience (HR) foams, according to U.S. Pat. No. 4,093,569. In this patent description, low viscosity dispersions are produced by reacting organic polyisocyanates with components having at least one hydroxyl group in the presence of more than 4% by weight of water.

An equilibrium product of two polyols, at least one of which is a polyester polyol, can be accomplished by heating the components at 230° C., in the presence of tetraisopropyl titanate as a catalyst. This equilibrium product is taught by U.S. Pat. No. 3,666,724 as a copolymer which gives a better resulting foam.

Also of interest is U.S. Pat. No. 4,296,213 which relates to polyurea polymer polyols made by the reaction of a hydroxyl-containing amine, a polyether polyol of about 3,000 to 8,000 molecular weight and an organic polyisocyanate. The hydroxyl-containing amines contemplated therein are described as ranging in molecular weight from about 60 to 200, preferably from about 60 to about 150. It was not realized that higher molecular weight, hydroxyl-containing amines, which also contain aromatic groups, would also give a polymer polyol which would impart enhanced properties to flexible polyurethane foams. Additionally, there is U.S. Pat. No. 4,435,527 which relates to polyester polymer polyols made with polyester polycarbonates and polyurethanes therefrom. The reader may also find of interest U.S. Pat. No. 4,374,209 which teaches a polymer-modified polyol formed by polymerizing an olamine, particularly an alkanolamine, with an organic polyisocyanate in the presence of a polyol. The polyaddition products from this process are said to constitute a stable dispersion in the polyol, and the resulting polymer-modified polyol is particularly useful as a polyol starting material for reaction with a polyisocyanate in the manufacture of polyurethane foam. However, the solids content of these polymer-modified polyols ranged only from about 1 to 35%. It would be desirable if this solids content could be increased. It is also noted that tertiary amines are recommended for use as catalysts in U.S. Pat. No. 4,374,209, while such catalysts are not recommended for use herein.

As mentioned, it would be desirable if polymer polyols could be prepared which would minimize the handling of toxic vinyl monomers, such as by eliminating the stripping of such monomers during the synthesis of the polymer polyols. It would further be desirable if polymer polyols could be made with a high solids content, up to 50 weight percent to provide polyurethane foams with enhanced properties. For example, such foams may have higher load bearing characteristics and may be more stable, but also providing a greater content of open cells.

SUMMARY OF THE INVENTION

Accordingly, it is an object of the present invention to provide polymer polyols having high solids contents, up to 50 wt. %.

It is another object of the present invention to provide polymer polyols with high solids contents that do not require the stripping of vinyl monomers and minimizes the handling of such toxic vinyl monomers.

It is yet another object of the invention to provide polymer polyols having high solids contents which will produce improved polyurethane foams, such as high resilience (HR) flexible foams, where the foams have more open cells.

In carrying out these and other objects of the invention, there are provided, in one form, polymer polyols with a high solids content made by the reaction of at least one alkanolamine with at least one polyisocyanate in a conventional polymer polyol as a dispersing media.

DETAILED DESCRIPTION OF THE INVENTION

The polymer polyols of this invention which have high solids content are made by the reaction of one or more alkanolamines with one or more polyisocyanates in a conventional polymer polyol as a dispersing media. While the polymer polyols of the invention are sometimes referred to in the singular as a polymer polyol, it must be remembered that the reaction product is actually a complex mixture of slightly different polymer polyols.

Many alkanolamines may be expected to be useful in preparing the inventive polymer polyols. Of particular interest are the following amines: monoethanolamine, diethanolamine, triethanolamine, triisopropanolamine, 2-(2-aminoethoxyethanol), hydroxyethylpiperazine, monoisopropanolamine, diisopropanolamine and mixtures thereof. Other alkanolamines which may be considered include N-methylethanolamine and phenylethanolamine.

The polyisocyanate used herein may be any aromatic or aliphatic polyisocyanate, such as toluene diisocyanates, polymeric isocyanates and aliphatic diisocyanates. Typical aromatic polyisocyanates include, but are not limited to, m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, diphenylene-4,4'-diisocyanate, aliphaticaromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate. Suitable aliphatic diisocyanates would include isophorone diisocyanate, hexamethylene diisocyanate and methylene-bis-cyclohexylisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyisocyanates and corresponding methylene-bridged polyphenyl polyisocyanates therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 wt.% methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt.% methylene diphenyl diisocyanate isomers, of which 20 to about 95 wt.% thereof is the 4,4'-isomer with the remainder being polymethylene polyphenyl polyisocyanates of higher moleuclar weight and functionality that have an average functionality of from about 2.1 to about 3.5. The isocyanate mixtures are known, commercially available materials and can be prepared by the process described in U.S. Pat. No. 3,362,979, issued Jan. 9, 1968 to Floyd E. Bentley.

Generally, the combined portion of the alkanolamine and organic polyisocyanate makes up about 5 to about 30 wt.% of the dispersed phase. The dispersing media or polymerization media in which the combined portion is reacted and dispersed is a conventional polymer polyol. Such a conventional polymer polyol is typically prepared by the polymerization of vinyl monomers in polyoxyalkylene glycols. However, the method of the present invention does not require the removal or stripping of these vinyl monomers and thus minimizes the handling of these toxic materials. Other suitable conventional polymer polyols are those made using polyether polyols, particularly those polyether polyols which have been modified with epoxy resins.

Since the polymer polyol of this invention has by definition free hydroxyl groups, the amount of polyisocyanate used to form the polymer polyol must be less than the stoichiometric amount needed to satisfy the active hydrogens of the hydroxyl and amine groups of the alkanolamines. In one embodiment in the making of these polymer polyols, the polyisocyanate is added to the reation mixture last. The ratio of the equivalents of the alkanolamine to the equivalents of the organic polyisocyanate in one embodiment ranges from 1 to 5. A preferred range for this ratio is from 2 to 3. In another version, the hydroxyl number range of these resulting, novel polyurethane polymer polyols should range from about 30 to about 90.

The alkanolamines and organic polyisocyanate can be successfully reacted without the application of external heat and atmospheric pressure, although higher temperatures and pressures would also be acceptable. For example, the reaction temperature could range from about 25 to about 100° C., and the pressure could range from atmospheric to about 100 psig.

A catalyst may be optionally used to finish the reaction to make the polymer polyols of the invention, but is not required. Catalytic quantities of organometallics may be used. Organometallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc.

The polymer polyol prepared from the above ingredients may then be incorporated into a formulation which results in a polyurethane product. The polymer polyol of the invention may be used in conjunction with a polyisocyanate such as those mentioned above or may be combined with additional polyols well known in the art, and reacted with a polyisocyanate to form a resulting polyurethane foam product.

The advantages of the polyurethane foams produced with the polymer polyols of this invention include providing HR flexible foams that are more stable and had more open cells than foams made using conventional polyols, as well as providing greater load bearing properties. The polymer polyols of the present invention may also be blended with conventional polyols to enhance the properties of the resulting foams beyond that possible with the conventional foams alone.

In order to form the polyurethane foam, a catalyst useful in preparing foams of this type is employed in the usual manner. Such catalyst may include those mentioned above, or one or more of the following:

(a) Tertiary amines such as trimethylamine, triethylamine, N-methylmorpholine, N-ethylmorpholine, N,N-dimethylbenzylamine, N,N-diemethylethanolamine, N,N,N',N'-tetramethyl-1,3-butanediamine, N,N-dimethylpiperazine, 1,4-diazabicyclo[2.2.2.]octane and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicyclaldehyde, cyclopentanone-1-carboxylate, acetylacetoneimine, bisacetylacetonealkylenediamines, salicyclaldehydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as Ti(OR)$_4$, Sn(OR)$_4$, Al(OR)$_3$, and the like, wherein R is alkyl or aryl, and the reaction products of alcoholates with carboxylic acids, beta-diketones, and 2-(N,N-dialkylamino)alkanols;

(g) Salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi and meta carbonyls of iron and cobalt.

Of course, combinations of any of the above polyurethane catalysts may be employed. Usually, the amount of catalyst employed ranges from about 0.01 to about 5.0 parts by weight percent based on 100 parts by weight of the polyol. More often the amount of catalyst used is 0.2 to 2.0 parts by weight.

Foaming is carried out in the presence of water and, optionally, additional organic blowing agents. The water is normally used in amounts of 0.5 to 15 parts by weight, preferably, 1.0 to 10 parts by weight (pbw) based on 100 parts by weight of the polyester polymer polyol and any additional polyol present. The organic blowing agents optionally used along with the water are known in the art and are, for example, monofluorotrichloromethane, difluorodichloromethane, methylene dichloride and others generally known in the art. Additives to regulate the cell size and the cell structure, for example, silicone oil such as dimethylpolysiloxanes, may also be added to the foaming mixture. Fillers, flame retarding additives, dyes or plasticizers of known types may also be used. These and other additives are well known to those skilled in the art.

The invention and its improvements over the art will now be illustrated with the aid of the following examples. These examples are intended to illustrate the invention, but are not intended to delineate the expected scope of the invention. It will be shown that the polymer polyols of the present invention will give more stable and more open celled polyurethane foams than those provided by prior art polymer polyols.

EXAMPLE 1

This example will illustrate the preparation of the polymer polyols of this invention. Into a one-liter, four-necked flask equipped with a stirrer, thermometer, water condenser, dropping funnel and nitrogen source were charged 360 g of NIAX ® 34-28 polymer polyol (made by Union Carbide Chemical Corp.), 19.7 g of triethanolamine, and 0.02 g of dibutyltin dilaurate catalyst. Toluene diisocyanate (20.3 g) was then added dropwise over a 15 minute period. The reaction temperature rose from 24° to 33° C., during that period and the reaction mixture was stirred an additional 35 minutes. The resultant product, which contained 28% polymer or solids, was a cream-colored viscous liquid.

EXAMPLES 2–4

This example will further illustrate the preparation of the polymer polyols of this invention using the general procedure described in Example 1. It will also serve to illustrate the alkanolamine/TDI (toluene diisocyanate) ratio which is useful for the invention.

| Polymer polyol: | 2 | 3 | 4 |
|---|---|---|---|
| Charge | | | |
| NIAX 34-28 polymer polyol, g | 900 | 900 | 844.5 |
| Diethanolamine, g | 54.7 | 44.6 | — |
| Triethanolamine, g | — | — | 133.3 |
| Toluene diisocyanate, g | 45.3 | 55.4 | 77.8 |
| Dibutyltin dilaurate, g | — | — | 0.02 |
| Equiv. alkanolamine/TDI | 3.0 | 2.0 | 3.0 |
| Reaction Details | | | |
| TDI addition time, min. | 30 | 30 | 20 |

-continued

| Polymer polyol: | 2 | 3 | 4 |
|---|---|---|---|
| Digestion time, hr. | 1.2 | 1.3 | 1.3 |
| Maximum temperature, °C. | 41 | 42 | 50 |
| Polymer (solids) content, % | 28 | 28 | 36 |
| Total amine, meq/g | — | — | 0.86 |
| Hydroxyl no., mg. KOH/g | 83.6 | 78.7 | 83.9 |
| Viscosity, 77° F., cps | 4600 | 10500 | 9060 |
| Appearance | Cream-colored dispersion | | |

EXAMPLE 5

This example will represent a scale-up preparation of the polymer polyols of this invention. Into a ten-gallon kettle were charged 36 lb. NIAX 34-28 polymer polyol and 2.2 lb. diethanolamine. The reactor was then purged with nitrogen. Toluene diisocyanate (1.8 lb.) was then added over a 25 minute period. The reaction temperature reached 35° C. during this period. After a two hour digestion, 1.8 g dibutyltin dilaurate was added to complete the reaction. The finished product had the following properties:

| Polymer polyol: Properties | 5 |
|---|---|
| Total amine, meq/g | 0.04 |
| Hydroxyl number, mg KOH/g | 103 |
| Viscosity, 77° F., cps | 3800 |
| Polymer (solids) content | 28 |
| Appearance | Cream-colored dispersion |

EXAMPLE 6

Using the procedure of Example 5, a polymer polyol was prepared by reacting 2.35 lbs. triethanolamine, 1.65 lbs. toluene diisocyante and 36 lbs. of NIAX 34-28 polymer polyol. Dibutyl tin dilaurate (1.8 g) was added to complete the reaction. The finished product had the following properties:

| Polymer polyol: Properties | 6 |
|---|---|
| Total amine, meq/g | 0.38 |
| Hydroxyl number, mg KOH/g | 64.3 |
| Viscosity, 77° F., cps | 6950 |
| Appearance | Cream-colored dispersion |

EXAMPLE 7

This example will illustrate the use of the polymer polyols of Example 2 in the preparation of high resilience (HR) flexible foams. It will further show that foams made using this polyol were completely open-celled and exhibited no tendency to shrink and were thus stable. Formulations, details of preparation and properties are shown in the following table:

| Foam number: | A |
|---|---|
| Ingredients, pbw | |
| THANOL ® SF-5505 | 60 |
| Polymer polyol of Example 2 | 40 |
| Water | 3.5 |
| TEXACAT ® TD-33 | 0.45 |
| NIAX A-1 catalyst | 0.08 |
| TEXACAT DM-70 | 0.3 |
| UL-1 Organotin catalyst | 0.0065 |
| L-5309 silicone | 1.5 |
| 80/20 TDI/MONDUR ® MR | 46.3 |

-continued

| Foam number: | A |
|---|---|
| Isocyanate index | 1.02 |
| Details of preparation | |
| Cream time, sec. | 9 |
| Rise time, sec. | 90 |
| Gel time, sec. | — |
| Properties | |
| Density, pcf | 2.0 |
| Gurley no. sec/100 ml | — |
| Appearance | Stable foam, good cell structure |

EXAMPLE 8

This example will show the preparation of foams using the polymer polyols of Examples 3 and 4. It will further show that foam made using the products of this invention were more stable and open-celled than those prepared using a 5000 molecular weight, high reactivity triol, THANOL SF-5505 made by Arco Chemical Co. The formulations, details of preparation, and properties are shown in the following table:

| Foam number: | B | C | D |
|---|---|---|---|
| Formulation, pbw | | | |
| THANOL ® SF-5505 | 60 | 60 | 100 |
| Polymer polyol of Example 5 | 40 | — | — |
| Polymer polyol of Example 6 | — | 40 | — |
| Water | 3.5 | 3.5 | 3.5 |
| TEXACAT TD-33 | 0.45 | 0.45 | 0.45 |
| NIAX A-1 catalyst | 0.08 | 0.08 | 0.08 |
| TEXACAT DM-70 | 0.3 | 0.3 | 0.3 |
| UL-1 Organotin catalyst | 0.0065 | 0.0065 | 0.0065 |
| L-5309 silicone | 1.5 | 1.5 | 1.5 |
| 80/20 TDI/MONDUR MR | 46.7 | 45.0 | 42.9 |
| Isocyanate index | 1.02 | 1.02 | 1.02 |
| Preparation Details | | | |
| Cream time, sec. | 9 | 8–9 | 7–8 |
| Rise time, sec. | 90 | 93 | 95 |
| Gel time, sec. | 170 | 140 | 140 |
| Properties | | | |
| Density, pcf | 1.8 | 1.92 | * |
| Gurley no., ml/100 sec. | 16 | 26 | |
| Appearance | Good cell structure | | |

*Foam shrank badly; could not be determined.

| GLOSSARY | |
|---|---|
| THANOL ® SF-5505 | 5000 molecular weight, high reactivity, glycerin-based triol, made by ARCO Chemical Co. |
| TEXACAT ® TD-33 | Polyurethane catalyst, 33% triethylenediamine in propylene glycol, made by Texaco Chemical Co. |
| NIAX ® A-1 | Polyurethane catalyst, 70% bis(dimethylaminoethyl)ether in propylene glycol, made by Union Carbide Chemical Co. |
| TEXACAT ® DM-70 | Polyurethane catalyst, 70% dimorpholinoethyl ether and 30% 1,4-dimethylpiperazine, made by Texaco Chemical Co. |
| UL-1 | Organotin compound sold by Witco Chemical Co. |
| L-5309 silicone | Silicone oil made by Dow-Corning Corp. |
| MONDUR ® MR | A 2.7 functionality polymeric isocyanate made by Mobay Chemical Co. |

It will be appreciated that the polymer polyols of the present invention may be made with no handling of toxic vinyl monomers that are used in conventional polymer polyols; no stripping of vinyl monomers is involved. Further, the polymer polyols of the present invention provides high solids or polymer content between 20 and 50% to provide higher load bearing foams. The polymer polyols of this invention provide foams with more open cells. With these polymer polyols, a better balance is achieved and the foams are more stable than those made with prior art polymer polyols.

Many modifications may be made in the methods and polymer polyols of this invention without departing from the spirit and scope thereof which are defined only by the appended claims. For example, one skilled in the art could probably devise a particular combination of components or method of reacting the alkanolamines and polyisocyanate in a conventional polymer polyol to give a polymer polyol with particularly advantageous properties.

We claim:

1. Polymer polyols with a high solids content made by the reaction of at least one alkanolamine with at least one organic polyisocyanate in a polymer polyol as a dispersing media.

2. The polymer polyols of claim 1 wherein polymer polyol is selected from the group of polymer polyols consisting of those made by the polymerization of vinyl monomers in polyoxyalkylene glycols, polyether polyols, and epoxy resin modified polyether polyols.

3. The polymer polyols of claim 1 wherein the alkanolamine is selected from the group consisting of monoethanolamine, diethanolamine, triethanolamine, triisopropanolamine, 2-(2-aminoethoxyethanol), hydroxyethylpiperzine, and mixtures thereof.

4. The polymer polyols of claim 1 wherein the organic polyisocyanate is selected from the group consisting of toluene diisocyanate, polymeric isocyanates, aliphatic diisocyanates and mixtures thereof.

5. The polymer polyols of claim 1 wherein the ratio of equivalents of alkanolamine groups to equivalents of isocyanate groups ranges from 1 to 5.

6. The polymer polyols of claim 1 wherein the reaction to make the polymer polyols is conducted at a temperature in the range from about 25° to about 100° C. and at a pressure in the range from about atmospheric to about 100 psig.

7. The polymer polyols of claim 1 wherein the solids content of the resulting polymer polyols is in the range between about 25 and about 50%.

8. Polymer polyols with a high solids content made by the reaction of at least one alkanolamine with at least one organic polyisocyanate in a polymer polyol as a dispersing media, wherein the ratio of equivalents of alkanolamine groups to equivalents of isocyanate groups ranges from 1 to 5, to give a mixture of polymer polyols with a solids content in the range between about 20 and about 50%.

9. The polymer polyols of claim 8 wherein the polymer polyol is selected from the group of polymer polyols consisting of those made by the polymerization of vinyl monomers in polyoxyalkylene glycols, polyether polyols and epoxy resin modified polyether polyols.

10. The polymer polyols of claim 8 wherein the alkanolamine is selected from the group consisting of monoethanolamine, diethanolamine, triethanolamine, triisopropanolamine, 2-(2-aminoethoxyethanol), hydroxyethylpiperazine, and mixtures thereof.

11. The polymer polyols of claim 8 wherein the organic polyisocyanate is selected from the group consisting of toluene diisocyanate, polymeric isocyanates, aliphatic diisocyanates and mixtures thereof.

12. The polymer polyols of claim 8 wherein the reaction to make the polymer polyols is conducted at a temperature in the range from about 25° to about 100° C. and at a pressure in the range from about atmospheric to about 100 psig.

13. A method for producing polymer polyols having a high solids content comprising reacting at least one alkanolamine with at least one organic polyisocyanate in a polymer polyol as a dispersing media.

14. The method of claim 13 wherein polymer polyol is selected from the group of polymer polyols consisting of those made by the polymerization of vinyl monomers in polyoxyalkylene glycols, polyether polyols and epoxy resin modified polyether polyols.

15. The method of claim 13 wherein the alkanolamine is selected from the group consisting of monoethanolamine, diethanolamine, triethanolamine, triisopropanolamine, 2-(2-aminoethoxyethanol), hydroxyethylpiperazine, and mixtures thereof.

16. The method of claim 13 wherein the organic polyisocyanate is selected from the group consisting of toluene diisocyanate, polymeric isocyanates, aliphatic diisocyanates and mixtures thereof.

17. The method of claim 13 wherein the ratio of equivalents of alkanolamine groups to equivalents of isocyanate groups ranges from 1 to 5.

18. The method of claim 13 wherein the reaction to make the polymer polyols is conducted at a temperature in the range of from about 25° to about 100° C. and at a pressure in the range from about atmospheric to about 100 psig.

19. The method of claim 13 wherein the solids content of the resulting polymer polyols is in the range between about 25 to about 50%.

* * * * *